United States Patent
Park et al.

(10) Patent No.: US 9,930,557 B2
(45) Date of Patent: Mar. 27, 2018

(54) METHOD BY WHICH TERMINAL REPORTS CHANNEL STATUS INFORMATION IN WIRELESS COMMUNICATION SYSTEM, AND APPARATUS THEREFOR

(71) Applicant: LG ELECTRONICS INC., Seoul (KR)

(72) Inventors: Jonghyun Park, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 15/021,196

(22) PCT Filed: Feb. 4, 2015

(86) PCT No.: PCT/KR2015/001148
§ 371 (c)(1),
(2) Date: Mar. 10, 2016

(87) PCT Pub. No.: WO2015/126080
PCT Pub. Date: Aug. 27, 2015

(65) Prior Publication Data
US 2016/0227429 A1 Aug. 4, 2016

Related U.S. Application Data

(60) Provisional application No. 61/941,421, filed on Feb. 18, 2014.

(51) Int. Cl.
*H04W 24/10* (2009.01)
*H04B 17/24* (2015.01)
(Continued)

(52) U.S. Cl.
CPC .......... *H04W 24/10* (2013.01); *H04B 7/0626* (2013.01); *H04B 17/24* (2015.01);
(Continued)

(58) Field of Classification Search
CPC .... H04B 7/0626; H04B 17/24; H04B 17/309; H04L 5/0023; H04L 5/0035;
(Continued)

(56) References Cited

U.S. PATENT DOCUMENTS

2013/0196675 A1 8/2013 Xiao et al.
2013/0242902 A1 9/2013 Liu et al.
(Continued)

FOREIGN PATENT DOCUMENTS

CN 103546208 A 1/2014
CN 103580819 A 2/2014
(Continued)

OTHER PUBLICATIONS

Catt, "On CSI feedback modes for CoMP," 3GPP TSG RAN WG1 Meeting #69, R1-122039, Prague, Czech Republic, May 21-25, 2012, 6 pages.
(Continued)

*Primary Examiner* — Khoa Huynh
(74) *Attorney, Agent, or Firm* — Birch, Stewart, Kolasch & Birch, LLP

(57) ABSTRACT

Disclosed is a method by which a terminal reports channel status information (CSI) to a base station in a wireless communication system. Particularly, the method comprises a step for setting a plurality of CSI processes through an upper layer, a step for pairing the plurality of CSI processes in two CSI process units; a step for calculating the CSI corresponding to each of the plurality of CSI processes by using a signal measurement resource and an interference measurement resource indicated by each of the plurality of CSI processes; and a step for reporting, to the base station, the CSI corresponding to each of the plurality of CSI processes, wherein the paired two CSI processes indicate a
(Continued)

common signal measurement resource and interference measurement resources, which are different from each other.

12 Claims, 12 Drawing Sheets

(51) Int. Cl.

| | | |
|---|---|---|
| H04B 7/06 | (2006.01) | |
| H04B 17/309 | (2015.01) | |
| H04L 5/00 | (2006.01) | |
| H04W 24/08 | (2009.01) | |
| H04W 72/08 | (2009.01) | |
| H04L 5/14 | (2006.01) | |
| H04W 72/00 | (2009.01) | |

(52) U.S. Cl.
CPC ......... *H04B 17/309* (2015.01); *H04L 5/0048* (2013.01); *H04L 5/0057* (2013.01); *H04L 5/0085* (2013.01); *H04L 5/0091* (2013.01); *H04W 24/08* (2013.01); *H04W 72/082* (2013.01); *H04W 72/085* (2013.01); *H04L 5/0023* (2013.01); *H04L 5/0035* (2013.01); *H04L 5/14* (2013.01); *H04W 72/00* (2013.01)

(58) Field of Classification Search
CPC ... H04L 5/0048; H04L 5/0057; H04L 5/0085; H04L 5/0091; H04L 5/14; H04W 24/08; H04W 24/10; H04W 72/00; H04W 72/082; H04W 72/085
See application file for complete search history.

(56) References Cited

U.S. PATENT DOCUMENTS

| | | | |
|---|---|---|---|
| 2013/0301432 A1* | 11/2013 | Hammarwall | H04W 24/02 370/252 |
| 2014/0016497 A1 | 1/2014 | Seo et al. | |
| 2014/0204807 A1* | 7/2014 | Li | H04B 1/50 370/277 |
| 2014/0348098 A1 | 11/2014 | Lee et al. | |

FOREIGN PATENT DOCUMENTS

| | | |
|---|---|---|
| KR | 10-2014-0012699 A | 2/2014 |
| WO | WO 2013/095041 A1 | 6/2013 |

OTHER PUBLICATIONS

Huawei et al., "CSI enhancements for TDD eIMTA," 3GPP TSG RAN WG1 Meeting #76, R1-140019, Prague, Czech Republic, Feb. 10-14, 2014 (Server date and downloaded by EPO on Feb. 9, 2014), 6 pages, XP050735587.

Intel Corporation, "CSI Process and Feedback Configuration for DL CoMP," 3GPP TSG-RAN WG2 #79bis, R2-124988, Bratislava, Slovakia, Sep. 8-12, 2012, 5 pages, XP050666729.

Samsung, "CSI test cases design for Downlink CoMP," 3GPP TSG-RAN WG4 Meeting #66, R4-130318, Malta, Malta, Jan. 28-Feb. 1, 2013 (Server date and downloaded by EPO on Jan. 21, 2013), 5 pages, XP050674803.

* cited by examiner

FIG. 2
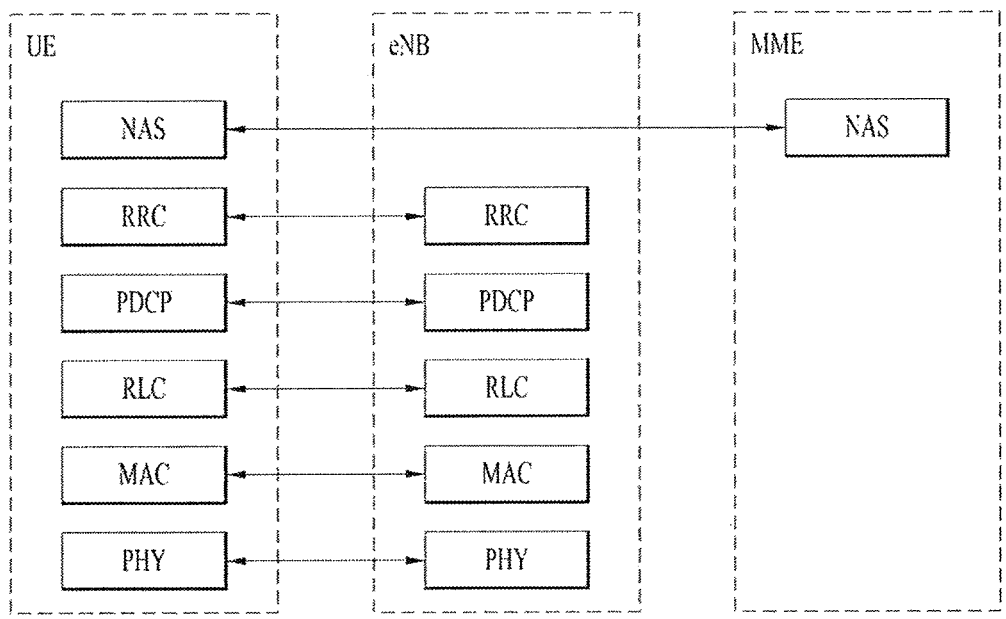
( a ) Control-Plane Protocol Stack
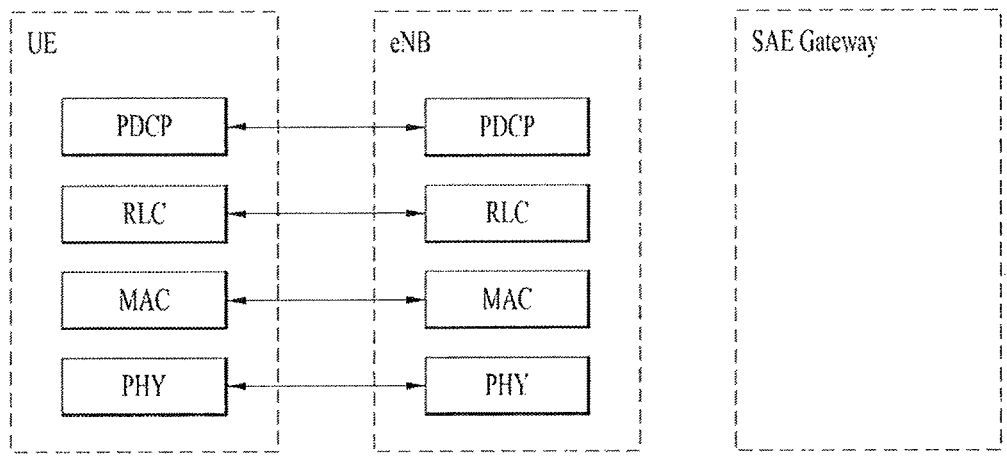
( b ) User-Plane Protocol Stack

☒ : DMRS GROUP 1

☒ : DMRS GROUP 2

METHOD BY WHICH TERMINAL REPORTS CHANNEL STATUS INFORMATION IN WIRELESS COMMUNICATION SYSTEM, AND APPARATUS THEREFOR

CROSS REFERENCE TO RELATED APPLICATIONS

This application is the National Phase of PCT International Application No. PCT/KR2015/001148, filed on Feb. 4, 2015, which claims priority under 35 U.S.C. 119(e) to U.S. Provisional Application No. 61/941,421, filed on Feb. 18, 2014, all of which are hereby expressly incorporated by reference into the present application.

TECHNICAL FIELD

The present invention relates to a wireless communication system, and more particularly, to a method by which a user equipment reports channel status information in a wireless communication system and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

Based on the aforementioned discussion, an object of the present invention is to provide a method by which a user equipment reports channel status information in a wireless communication system and an apparatus therefor.

Technical Solution

According to one embodiment of the present invention, a method by which a user equipment reports channel status information (CSI) to a base station in a wireless communication system comprises the steps of configuring a plurality of CSI processes through an upper layer; pairing the plurality of CSI processes in two CSI process units; calculating the CSI corresponding to each of the plurality of CSI processes by using a signal measurement resource and an interference measurement resource indicated by each of the plurality of CSI processes; and reporting, to the base station, the CSI corresponding to each of the plurality of CSI processes, wherein the two paired CSI processes indicate a common signal measurement resource and interference measurement resources, which are different from each other.

Preferably, the interference measurement resources respectively correspond to a subframe set of which dynamic usage change is possible and a subframe set of which dynamic change is not possible. The common signal measurement resource is a resource for measuring signals from one transmission point. Particularly, CSIs corresponding to the two paired CSI processes are preferably calculated at their respective times different from each other.

Additionally, the method further comprises the step of receiving information of the paired CSI processes from the base station. The paired CSI processes may have indexes determined based on the number of maximum CSI processes supported by the user equipment. In this case, the step of pairing the plurality of CSI processes includes pairing CSI process #k with CSI process #(k+P), and P is the number of maximum CSI processes supported by the user equipment.

More preferably, the signal measurement resource and the interference measurement resources are defined as resources for a channel status information-reference signal (CSI-RS).

In another aspect, a user equipment in a wireless communication system according to another embodiment of the present invention comprises a wireless communication module for transmitting and receiving a signal to and from a base station; and a processor for processing the signal, wherein the processor configures a plurality of CSI processes through an upper layer, pairs the plurality of CSI processes in two CSI process units, calculates the CSI corresponding to each of the plurality of CSI processes by using a signal measurement resource and an interference measurement resource indicated by each of the plurality of CSI processes, and controls the wireless communication module to transmit the CSI corresponding to each of the plurality of CSI processes to the base station, and the two paired CSI processes indicate a common signal measurement resource and interference measurement resources, which are different from each other.

Advantageous Effects

According to the embodiment of the present invention, a user equipment can report channel status information more efficiently in a status that a usage of wireless communication resources is changed dynamically.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 2 is a diagram illustrating structures of a control plane and a user plane of a radio interface protocol between a UE and an E-UTRAN based on the 3GPP radio access network specification.

BEST MODE FOR CARRYING OUT THE INVENTION

Figure 1:
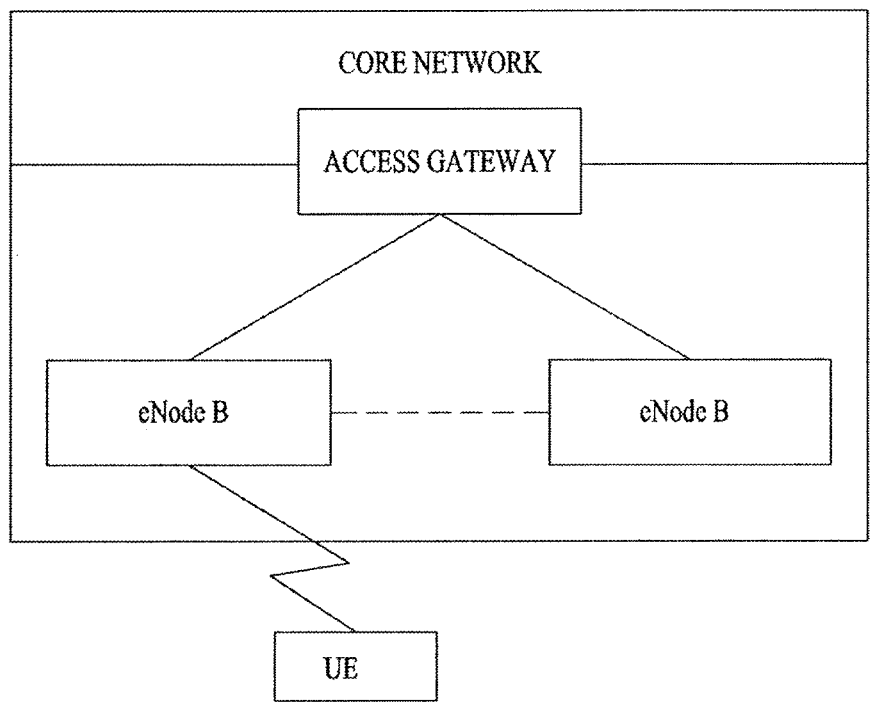
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting a base station eNB is set to one of bandwidths of 1.4, 3.5, 5, 10, 15, and 20 MHz and provides a downlink or uplink transmission service to several UEs. At this time, different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
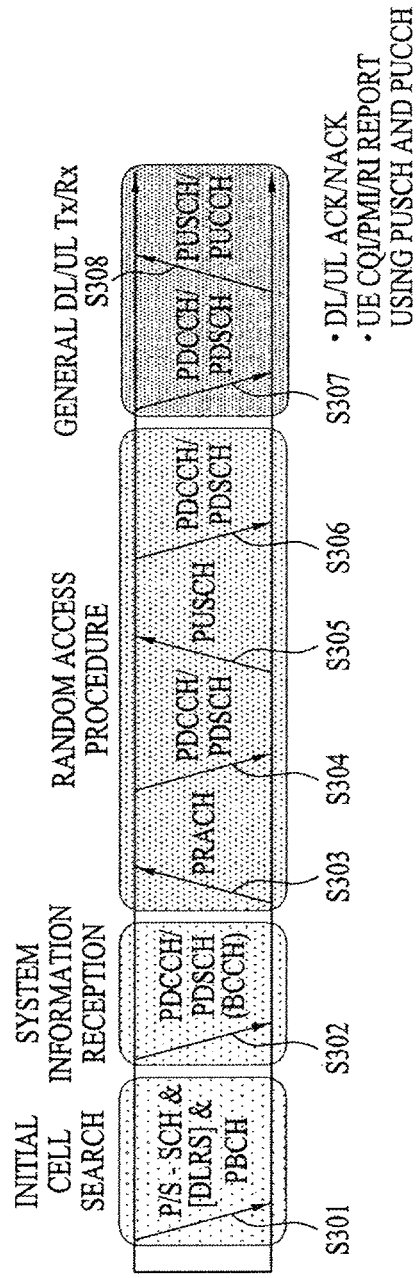
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
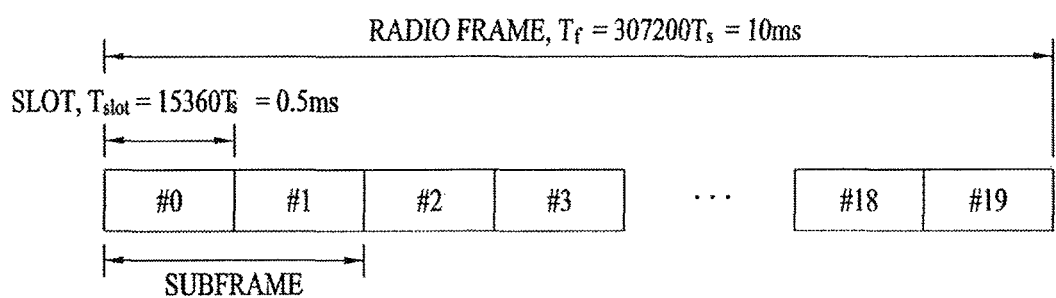
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms (15360 $T_s$). In this case, $T_s$ denotes a sampling time represented by $T_s=1/(15 \text{ kHz} \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
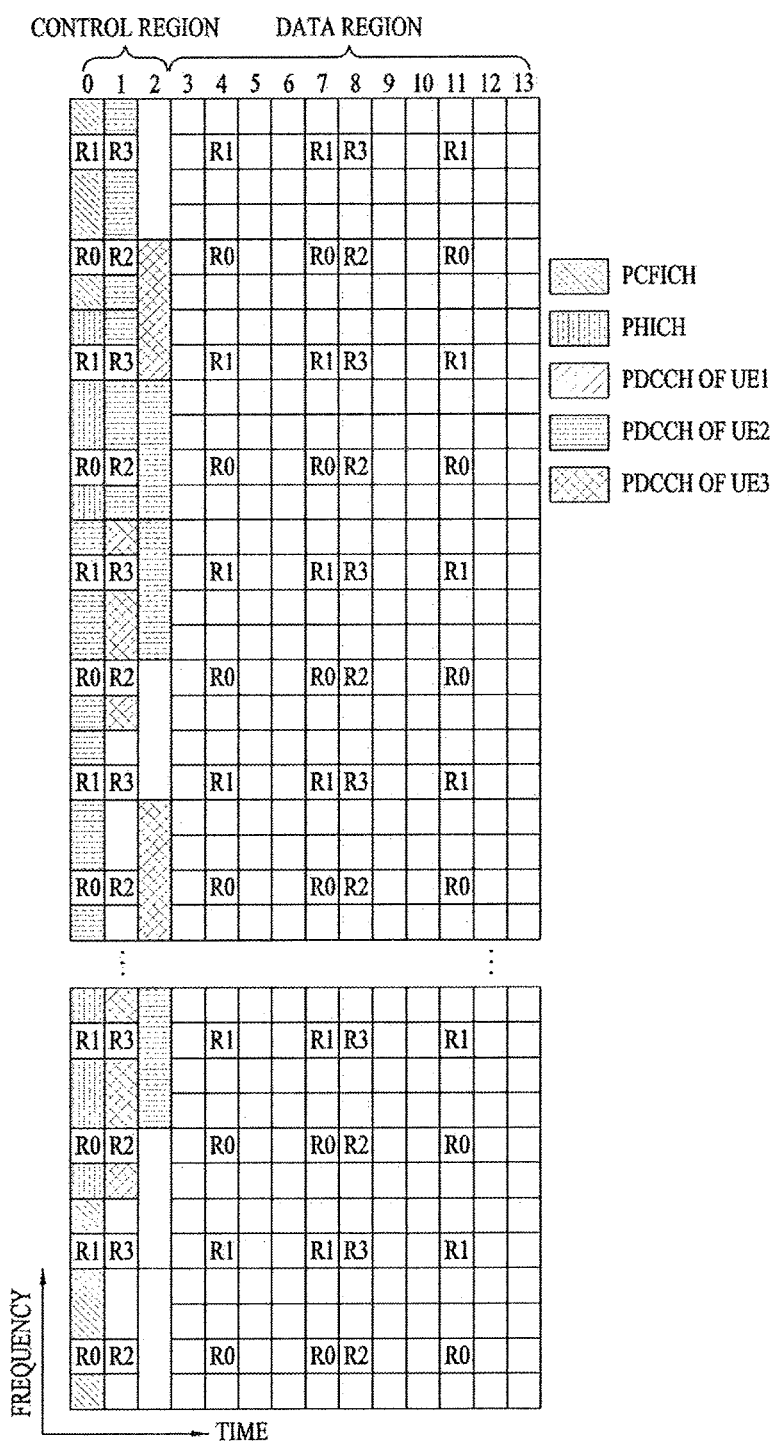
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
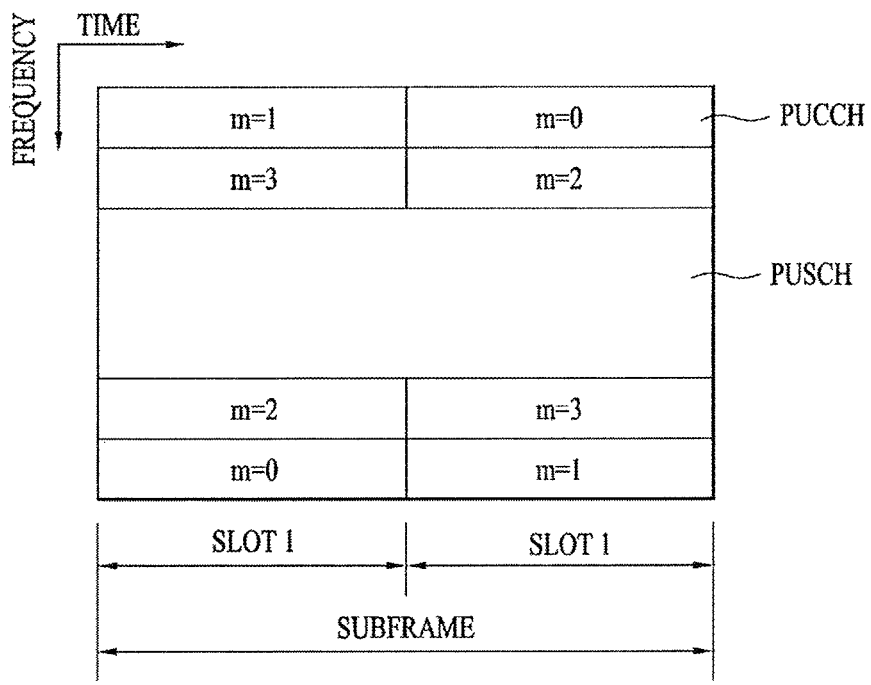
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
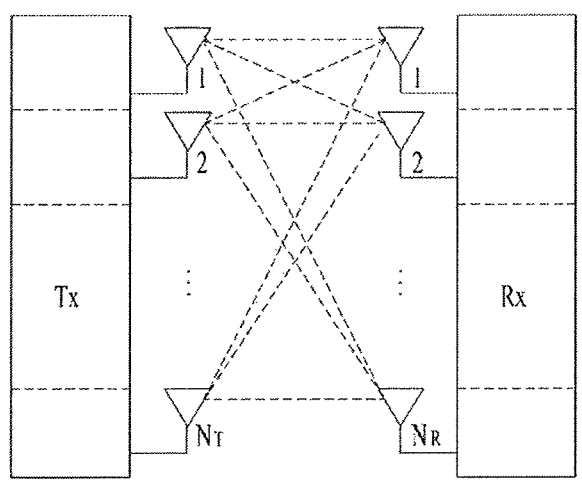
FIG. 7 is a diagram illustrating a configuration of a general MIMO communication system.

FIG. 7 illustrates the configuration of a typical MIMO communication system.

A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed by the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals are $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the next-generation mobile communication standard, LTE-A, will support coordinated multi-point (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)). In contrast, in downlink CoMP-CS/CB, a UE may receive data instantaneously from one eNB, that is, a serving eNB by beamforming.

In UL CoMP-JP, each eNB may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Hereinbelow, transmission modes for a DL data channel will be described. A current 3GPP LTE standard specification, 3GPP TS 36.213 defines DL data channel transmission modes as illustrated in [Table 1]. A DL data channel transmission mode is indicated to a UE by higher-layer signaling, that is, RRC signaling.

TABLE 1

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Large delay CDD or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
|  | DCI format 1 | Single-antenna port, port 5 |
| Mode 8 | DCI format 1A | If the number of PBCH antenna ports is one, Single-antenna port, port 0 is used, otherwise Transmit diversity |
|  | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2D | Up to 8 layer transmission, ports 7-14 or single-antenna port, port 7 or 8 |

Referring to [Table 1], the 3GPP LTE standard specification defines DCI formats according to the types of RNTIs by which a PDCCH is masked. Further, DCI format 1A is additionally defined for application irrespective of transmission modes, that is, for a fall-back mode. As an example of an operation of a transmission mode, referring to Table 1, if a user equipment performs a blind decoding on PDCCH masked with C-RNTI and then detects a DCI format 1B, the user equipment decodes PDSCH in an assumption that the PDSCH has been transmitted with a closed-loop spatial multiplexing scheme using a single transmission layer.

In Table 1, a transmission mode 10 indicates a downlink data channel transmission mode of the aforementioned CoMP transmission method. For instance, referring to Table 1, if a user equipment performs a blind decoding on PDCCH masked with C-RNTI and then detects a DCI format 2D, the user equipment decodes PDSCH in an assumption that the PDSCH has been transmitted with a multi-layer transmission scheme based on antenna port 7 to 14, i.e., DM-RS. Or, the user equipment decodes PDSCH in an assumption that the PDSCH has been transmitted with a single antenna transmission scheme based on DM-RS antenna port 7 or 8.

On the contrary, if the user equipment performs blind decoding on PDCCH masked with C-RNTI and then detects a DCI format 1A, a transmission mode varies according to whether a corresponding subframe corresponds to an MBSFN subframe. For instance, if the corresponding subframe corresponds to a non-MBSFN subframe, the user equipment decodes PDSCH in an assumption that the PDSCH has been transmitted with a single antenna transmission scheme based on a CRS of an antenna port 0 or a CRS-based transmit diversity scheme. And, if the corresponding subframe corresponds to an MBSFN subframe, the user equipment decodes the PDSCH in an assumption that the PDSCH has been transmitted with a single antenna transmission based on a DM-RS of an antenna port 7.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
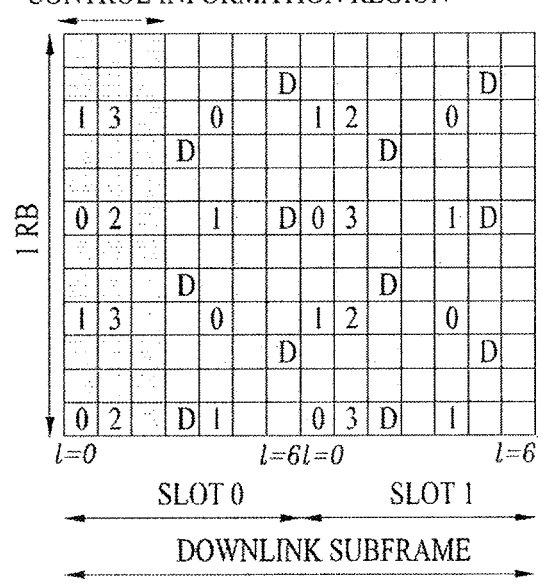
FIG. 8 and FIG. 9 are diagrams of a structure of a reference signal in LTE system supportive of downlink transmission using 4 antennas.
Figure 9:
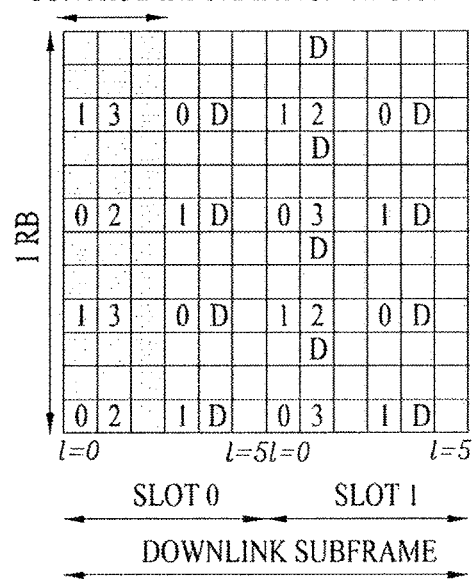

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

Figure 10:
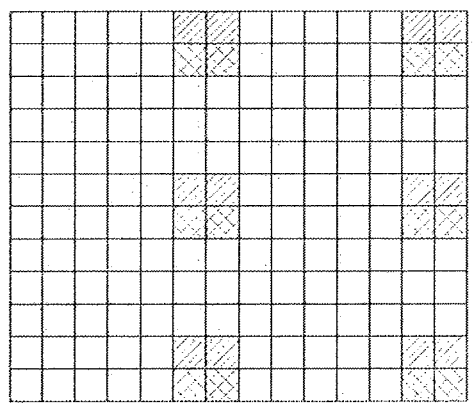
FIG. 10 is a diagram for an example of assigning a downlink DM-RS defined by a current 3GPP standard document.

FIG. 10 illustrates an exemplary DL DMRS allocation defined in a current 3GPP standard specification.

Referring to FIG. 10, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 2] and [Table 3] list CSI-RS configurations defined in the 3GPP standard. Specifically, [Table 2] lists CSI-RS configurations in the case of a normal CP and [Table 3] lists CSI-RS configurations in the case of an extended CP.

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod2 | (k', l') | $n_s$ mod2 | (k', l') | $n_s$ mod2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |

TABLE 2-continued

| CSI reference signal configuration | Number of CSI reference signals configured | | | | | |
|---|---|---|---|---|---|---|
| | 1 or 2 | | 4 | | 8 | |
| | (k', l') | $n_s$ mod2 | (k', l') | $n_s$ mod2 | (k', l') | $n_s$ mod2 |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod2 | (k', l') | $n_s$ mod2 | (k', l') | $n_s$ mod2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
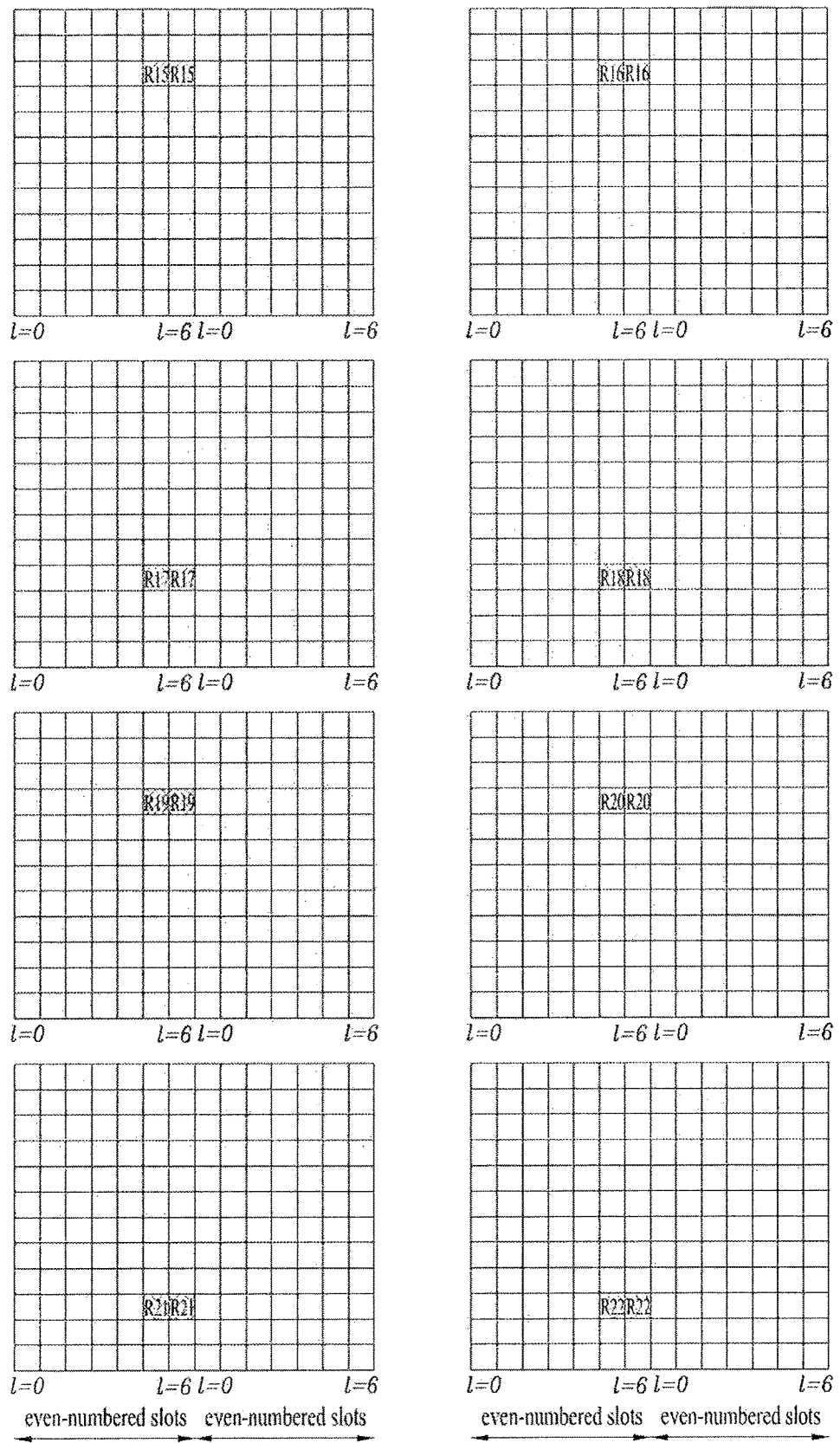
FIG. 11 is a diagram for an example of a CSI-RS configuration #0 in case of a normal CP among downlink CSI-RS configurations defined by a current 3GPP standard document.

In [Table 2] and [Table 3], (k', l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 4] lists CSI-RS subframe configurations defined in the 3GPP standard.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Information about a Zero Power (ZP) CSI-RS is transmitted in a CSI-RS-Config-r10 message configured as illustrated in [Table 5] by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 4]. zeroTxPowerResourceConfigList-r10 indicates a ZP CSI-RS configuration. The elements of this bitmap indicate the respective configurations written in the columns for four CSI-RS antenna ports in [Table 2] or [Table 3]. That is, the current 3GPP standard defines a ZP CSI-RS only for four CSI-RS antenna ports.

TABLE 5

```
-- ASN1START
CSI-RS-Config-r10 ::=        SEQUENCE {
    csi-RS-r10               CHOICE {
        ...
    }
    zeroTxPowerCSI-RS-r10    CHOICE {
        release              NULL,
```

TABLE 5-continued

```
    set up                                SEQUENCE {
        zeroTxPowerResourceConfigList-r10 BIT   STRING (SIZE (16)).
        zeroTxPowerSubframeConfig-r10         INTEGER (0..154)
    }
  }
}
-- ASN1STOP
```

The current 3GPP standard defines modulation orders and cording rates for respective CQI indexes as illustrated in [Table 6].

TABLE 6

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A CQI is calculated based on interference measurement as follows.

A UE needs to measure a Signal to Interference and Noise Ratio (SINR) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets $C_{CSI,0}$ and $C_{CSI,1}$ may be configured by higher-layer signaling and the subframes of each subframe set are different from the subframes of the other subframe set. In this case, the UE may perform S-measure in an RS such as a CSI-RS without any specific subframe constraint. However, the UE should calculate CQIs separately for the CSI measurement subframe sets $C_{CSI,0}$ and $C_{CSI,1}$ through separate I-measures in the CSI measurement subframe sets $C_{CSI,0}$ and $C_{CSI,1}$.

In the recent wireless communication system, in the case that the eNB performs a duplex operation by splitting all available resources into downlink resources and uplink resources, the technology for more flexibly changing an operation for selecting a usage of each resource as one of the downlink resources and the uplink resources has been discussed.

The dynamic resource usage change is advantageous in that optimized resource distribution can be performed every time in a status that sizes of downlink traffic and uplink traffic are dynamically changed. For example, FDD system manages a frequency band by splitting the frequency band into a downlink band and an uplink band. For such dynamic resource usage change, the eNB may designate whether a specific band corresponds to downlink resources or uplink resources at a specific time through RRC layer, MAC layer, or physical layer signal.

Particularly, TDD system splits all subframes into uplink subframes and downlink subframes and uses them as uplink transmission of the UE and downlink transmission of the eNB, respectively. This will be described with reference to the accompanying drawing.

Figure 12:
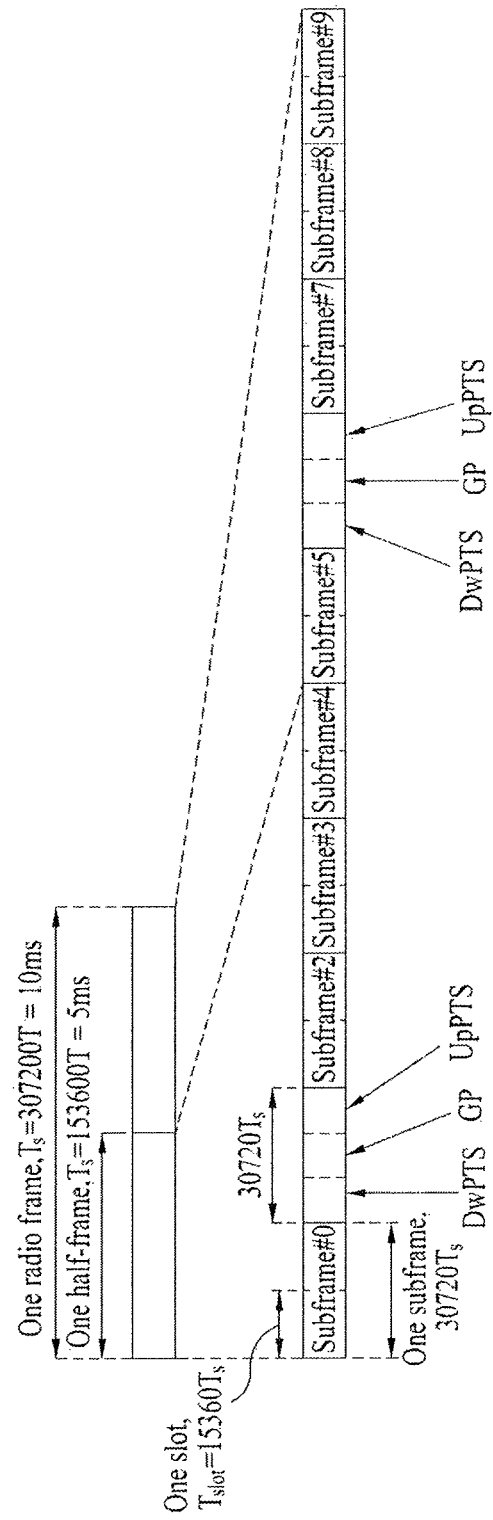
FIG. 12 illustrates a structure of a radio frame in an LTE TDD system.

FIG. 12 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 7 below.

TABLE 7

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 7 above, D, U, and S refer to a downlink subframe, an uplink subframe, and the special subframe. In addition, Table 7 also shows downlink-to-uplink switch-point periodicity in an uplink/downlink subframe configuration in each system. In addition to the uplink/downlink subframe configuration of Table 7, new uplink/downlink subframe configuration may be provided additionally.

In the aforementioned TDD system, for dynamic resource usage change, the eNB may designate whether a specific subframe corresponds to downlink resources or uplink resources at a specific time through RRC layer, MAC layer, or physical layer signal.

In the legacy LTE system, downlink resources and uplink resources are designated through system information. Since the system information should be transmitted to a plurality of unspecified UEs, a problem may occur in the operation of legacy UEs in case of dynamic change. Therefore, it is preferable that information on the dynamic resource usage change is forwarded to UEs, which is currently connected with the eNB, through new signaling, especially UE-specific signaling, not the system information. This new signaling may indicate a configuration of dynamically changed resources, for example, uplink/downlink subframe configuration different from that indicated on the system information in the TDD system.

Hereinafter, a massive MIMO scheme that may have a plurality of input and output antennas and multi-dimensional antenna array will be described. A next generation wireless communication system considers the introduction of an active antenna system (AAS). Unlike a legacy passive antenna separate from an amplifier capable of adjusting the phase and magnitude of a signal, an active antenna refers to an antenna including an active device such as an amplifier. The active antenna system does not require a separate cable, connector, other hardware, etc. for connecting the amplifier with the antenna, and has high efficiency in view of energy consumption and operating costs. Specifically, since the active antenna system supports electronic beam control per antenna, the active antenna system allows advanced MIMO technology, e.g., precise beam pattern forming in consideration of beam direction and beam width or 3-dimensional (3D) beam pattern forming.

As such an advanced antenna system as an active antenna is introducing, a massive MIMO structure having a plurality of input/output antennas and a multi-dimensional antenna array is also considered. As an example, if a 2-dimensional antenna array is formed instead of a legacy straight antenna array (or 1-dimensional antenna array), a 3-dimensional beam pattern can be formed using an active antenna of the active antenna system.

Figure 13:
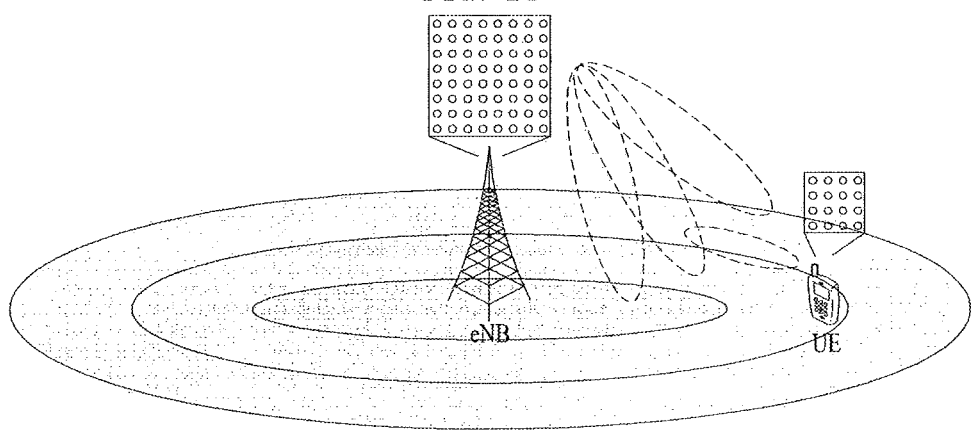
FIG. 13 is a conceptual diagram illustrating massive MIMO technology.

FIG. 13 illustrates a conceptual view of massive MIMO technology. In particular, FIG. 13 illustrates a system in which an eNB or a UE has multiple transmission/reception (Tx/Rx) antennas capable of 3D beamforming based on an active antenna system.

Referring to FIG. 13, when a 3D beam pattern is used in view of Tx antennas, quasi-static or dynamic beamforming can be performed not only in the horizontal beam direction but also in the vertical beam direction, and application such as vertical-direction sector forming can be considered. In view of Rx antennas, when Rx beams are formed using a massive Rx antenna, increase in signal power based on an antenna array gain may be expected.

Therefore, in case of uplink, the eNB may receive signals transmitted from the UE, through multiple antennas. In this case, the UE may configure its Tx power to a very low level in consideration of a gain of the massive Rx antenna to reduce the influence of interference.

Based on the aforementioned discussion, if a usage of radio resources in dynamically changed in the TDD system, a method for configuring CSI process according to the present invention will be described. In this case, the CSI process refers to a series of procedures of performing CSI report by means of the UE, and one or more CSI processes may be configured for one UE. According to the related art, each CSI process may be defined by one NZP CSI-RS resource and one CSI-IM resource.

In particular, according to the present invention, under the status that a usage of radio resources is dynamically changed in the TDD system, to measure and report CSI suitable for each of a subframe (hereinafter, dynamic subframe) for which a usage of radio resources can dynamically be changed and a subframe (hereinafter, static subframe) for which a usage of radio resources cannot be changed dynamically, a method for configuring CSI process will be suggested.

In more detail, 1) a method for defining one CSI process through combination of one NZP CSI-RS resource and two CSI-IM resources may be considered, or 2) a method for defining two CSI processes through one NZP CSI-RS resource and different CSI-IM resources may be considered. According to these methods, it is advantageous in that a plurality of CSI processes are substantially configured for a UE for which one CSI process may be configured.

In particular, the method 2) will be described in more detail. In case of a specific UE for which one CSI process is configured, when the corresponding UE is operated in a transmission mode 10, that is, CoMP mode, the following operations may be performed.

If a usage change function of radio resources is configured for the specific UE, two CSI processes are signaled to the specific UE. However, it may be regarded that NZP CSI-RS resources of the CSI processes are the same as each other. That is, the UE does not expect that the NZP CSI-RS resources indicated by two CSI processes are different from each other. In this case, the eNB should signal whether to report CSI corresponding to a CSI process through a DCI (Downlink Control Information) field of 2 bits.

On the other hand, if a usage change function of radio resources is not configured for the specific UE, the specific UE does not expect that two CSI processes are signaled thereto. That is, the specific UE may be defined that only one CSI process is signaled to thereto.

Meanwhile, in case of a UE capable of performing 3, 4 or more CSI processes, operations that can be performed for a case that a usage change function of radio resources is configured for the UE will be described as follows. For convenience of description, a UE capable of performing P number of CSI processes will be described exemplarily.

First of all, the UE may be defined that maximum L*P number of CSI processes may be configured therefor. Hereinafter, although a case of L=2 will be described exemplarily to correspond to each of a static subframe set and a dynamic subframe set, L may be an integer value of 2 or more, and may mean the number of CSI processes to which a specific restriction described hereinafter is given.

In other words, the UE may be defined/configured that maximum 6 CSI processes may be configured in case of a UE of P=3 and maximum 8 CSI processes may be configured in case of a UE of P=4. However, a restriction that maximum P number of CSI processes of maximum 2*P number of CSI processes may be configured by combination of one NZP CSI-RS resource and one CSI-IM resource freely like the legacy CSI process may be given. On the other hand, it is preferable that the other CSI processes are configured by pairing with any one of the maximum P number of CSI processes.

For example, a common NZP CSI-RS resource should be configured between two paired CSI processes, and CSI-IM resources are configured for the two paired CSI processes differently from each other. Additionally, to avoid excessive CSI calculation complexity, a restriction that the paired CSI processes are not reported by aperiodic CSI triggering of one time may be given, and a restriction that another subframe set for channel measurement in addition to the static subframe set and the dynamic subframe set is not configured may be given additionally.

Hereinafter, an example of pairing of the CSI processes will be described. Supposing that each CSI process index is CSI process index ∈ {1, 2, . . . , 2P}, pairing may be defined to be always performed between a specific CSI process index k ∈ {1, 2, . . . , P} and a CSI process index k+P.

Figure 14:
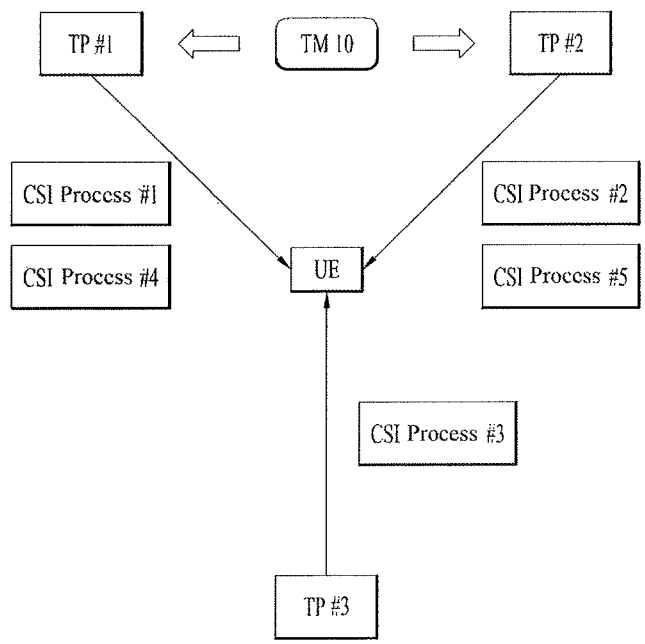
FIG. 14 is a diagram illustrating an example of pairing of CSI processes in accordance with the embodiment of the present invention.

FIG. 14 is a diagram illustrating an example of pairing of CSI processes in accordance with the embodiment of the present invention. For convenience of description, it is assumed that a total of 5 CSI processes (index ∈ {1, 2, . . . , 5}) are configured for a P=3 UE, i.e., a UE capable of performing 3 CSI processes, from the eNB. Under the assumption, the following pairings may be performed as illustrated in FIG. 14.

Pairing #1: CSI process #1 and CSI process #4(=1+P)
Pairing #2: CSI process #2 and CSI process #5(=2+P)

However, CSI process #3 which does not belong to any pairing may exist.

The above example of the pairings will be described in more detail. The pairing #1 means two CSI process #1 and CSI process #4 corresponding to different interference statuses (that is, different CSI-IM resources are configured) for a specific TP #1 (that is, common NZP CSI-RS resource #1 is configured). Likewise, the pairing #2 means two CSI process #2 and CSI process #5 corresponding to different interference statuses (that is, different CSI-IM resources are configured) for a specific TP #2 (that is, common NZP CSI-RS resource #2 is configured).

Additionally, the CSI process #3 may be a type that includes a specific NZP CSI-RS3 for a case that another specific TP2 is transmitted to support CoMP. However, since the number of CSI-IM resources configured for one UE is limited to 3 in the current LTE standard, it is required to extend the CSI-IM resources configured for one UE to CSI-IM resources more than 3 to implement the present invention.

In the above example, pairing between the CSI process index k ∈ {1, 2, . . . , P} and the CSI process index k+P may be normalized as pairing between CSI process #m and CSI process index m' (m'=mod(m, P)).

As another example of the aforementioned pairing, pairing may be defined in the form of {1, 2}, {3, 4}, . . . if indexes of the CSI processes are given like 1, 2, 3, . . . . If the number of CSI processes is 2, CSI process #1 and CSI process #2 are paired. If the number of CSI processes is 3, CSI process #1 and CSI process #2 are paired, and CSI process #3 is an independent CSI process which is not paired. Also, if the number of CSI processes is 4, CSI process #1 and CSI process #2 are paired, and CSI process #3 and CSI process #4 are paired.

Such a pairing rule is only exemplary, and it is to be understood that similar modified rules are included in the spirits of the present invention. Of course, to avoid excessive CSI calculation complexity, a restriction that the paired CSI processes are not reported by aperiodic CSI triggering of one time may be given, and a restriction that another subframe set for channel measurement in addition to the static subframe set and the dynamic subframe set is not configured may be given additionally.

Meanwhile, this pairing information may be signaled explicitly by the eNB, and signaling may be RRC signaling which is semi-static signaling, or may be DCI which is dynamic signaling. For example, if a total of 5 CSI processes are configured for a UE capable of performing maximum 3 CSI processes, information indicating that CSI process #1 and CSI process #2 correspond to pairing #1, CSI process #3 and CSI process #4 correspond to pairing #2, and CSI process #5 is an independent CSI process which does not belong to any pairing with respect to the CSI processes #1 to #5 may be indicated explicitly through RRC signaling or DCI.

As another example, if a total of 6 CSI processes are configured for a UE capable of performing maximum 3 CSI processes, information indicating that CSI process #1 and CSI process #2 correspond to pairing #1, CSI process #3 and CSI process #4 correspond to pairing #2, and CSI process #5 and CSI process #6 correspond to pairing #3 with respect to the CSI processes #1 to #6 may be indicated explicitly through RRC signaling or DCI.

In the above example, although the number of CSI processes that can be performed by the UE is 3 or 4, the above example may equally be applied to even a case that the number of CSI process that can be performed by the UE is 1. That is, if a usage change function of radio resources is configured for a specific UE capable of performing one CSI process, the eNB may configure two CSI processes, and the corresponding two CSI processes are defined by a common NZP CSI-RS resource and CSI-IM resources different from each other by pairing. In this case, the restriction that the paired CSI processes are not reported by aperiodic CSI triggering of one time may be given, and the restriction that another subframe set for channel measurement in addition to the static subframe set and the dynamic subframe set is not configured may be given additionally.

Although the present invention has been described on the assumption that a usage change of radio resources is dynamically performed in the TDD system, the CSI-IM resource may commonly be given between the CSI processes different from each other in the 2-dimensional antenna array. In this case, for example, the suggested methods may be applied in such a manner that the common CSI-IM resource is configured between the two paired CSI processes and the NZP CSI-RS resources are configured differently from each other.

Figure 15:
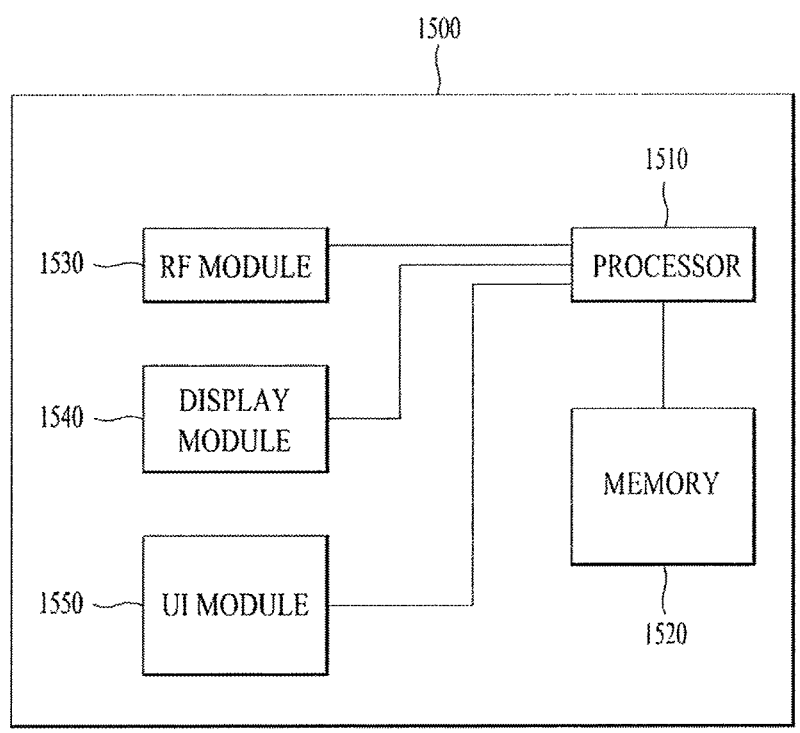
FIG. 15 is a block diagram of a communication apparatus according to an embodiment of the present invention.

FIG. 15 is a block diagram of a communication apparatus according to an embodiment of the present invention.

Referring to FIG. 15, the communication device 1500 includes a processor 1510, a memory 1520, an RF module 1530, a display module 1540, and a user interface module 1550.

The communication device 1500 is illustrated for convenience of description and some modules may not be omitted. The communication device 1500 may further include necessary modules. In addition, some modules of the communication device 1500 may be subdivided. The processor 1510 is configured to perform operations according to the embodiment of the present invention that is exemplified with reference to the diagrams. In detail, a detailed operation of the processor 1510 would be understood with reference to FIGS. 1 to 14.

The memory 1520 is connected to the processor 1510 and stores an operating system, an application, a program code, data, etc. The RF module 1530 is connected to the processor 1510 and converts a baseband signal into a radio signal or converts a radio signal into a baseband signal. To this end, the RF module 1530 performs analog conversion, amplification, filtering, and frequency up-conversion, or inverse procedures thereof. The display module 1540 is connected to the processor 1510 and displays various pieces of information. The display module 1540 may use, but is not limited to, well-known elements such as a liquid crystal display (LCD), a light emitting diode (LED), and an organic light emitting diode (OLED). The user interface module 1550 may be connected to the processor 1510 and may include a combination of well-known user interfaces such as keypads, touchscreens, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The 'base station' (BS) may be replaced with terminologies such as a fixed station, Node B, eNode B (eNB), and an access point (AP).

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned method by which a user equipment reports channel status information in a wireless communication system and the aforementioned apparatus therefor have been described based on the 3GPP LTE system, the method and apparatus may be applied to various wireless communication systems in addition to the 3GPP LTE system.

The invention claimed is:

1. A method for a user equipment (UE) to report channel status information (CSI) to a base station (BS) in a wireless communication system, the method comprising:
configuring a plurality of CSI processes through an upper layer;
pairing the plurality of CSI processes in two CSI process units;
calculating the CSI corresponding to each of the plurality of CSI processes by using a signal measurement resource and an interference measurement resource indicated by each of the plurality of CSI processes; and
reporting, to the base station, the CSI corresponding to each of the plurality of CSI processes,
wherein the two paired CSI processes indicate a common signal measurement resource and different interference measurement resources, and
wherein the pairing the plurality of CSI processes includes pairing a CSI process #k with a CSI process #(k+P), and P is a maximum number of CSI processes supported by the UE.

2. The method according to claim 1, wherein the interference measurement resources respectively correspond to a subframe set of which dynamic usage change is possible and a subframe set of which dynamic change is not possible.

3. The method according to claim 1, wherein the common signal measurement resource is a resource for measuring signals from one transmission point.

4. The method according to claim 1, wherein CSIs corresponding to the two paired CSI processes are calculated at their respective times different from each other.

5. The method according to claim 1, further comprising the step of receiving information of the paired CSI processes from the base station.

6. The method according to claim 1, wherein the signal measurement resource and the interference measurement resources are defined as resources for a channel status information-reference signal (CSI-RS).

7. A user equipment (UE) in a wireless communication system, the UE comprising:
a wireless communication module for transmitting and receiving a signal to and from a base station(BS); and
a processor that:
configures a plurality of channel status information (CSI) processes through an upper layer,
pairs the plurality of CSI processes in two CSI process units,
calculates the CSI corresponding to each of the plurality of CSI processes by using a signal measurement resource and an interference measurement resource indicated by each of the plurality of CS processes, and
reports, to the base station, the CSI corresponding to each of the plurality of CSI processes,
wherein the two paired CSI processes indicate a common signal measurement resource and different interference measurement resources, and
wherein, to pair the plurality of CSI processes, the processor pairs a CSI process #k with a CSI process #(k+P), and P is a maximum number of CSI processes supported by the UE.

8. The user equipment according to claim 7, wherein the interference measurement resources respectively correspond to a subframe set of which dynamic usage change is possible and a subframe set of which dynamic change is not possible.

9. The user equipment according to claim 7, wherein the common signal measurement resource is a resource for measuring signals from one transmission point.

10. The user equipment according to claim 7, wherein CSIs corresponding to the two paired CSI processes are calculated at their respective times different from each other.

11. The user equipment according to claim 7, wherein the wireless communication module receives information of the paired CSI processes from the base station.

12. The user equipment according to claim 7, wherein the signal measurement resource and the interference measurement resources are defined as resources for a channel status information-reference signal (CSI-RS).

* * * * *